United States Patent
Yin

(10) Patent No.: US 9,541,063 B2
(45) Date of Patent: Jan. 10, 2017

(54) METHOD OF OPERATING A WIND PARK

(71) Applicant: Siemens Aktiengesellschaft, Munich (DE)

(72) Inventor: Bo Yin, Brande (DK)

(73) Assignee: Siemens Aktiengesellschaft, Munich (DE)

(*) Notice: Subject to any disclaimer, the term of this patent is extended or adjusted under 35 U.S.C. 154(b) by 115 days.

(21) Appl. No.: 14/530,768

(22) Filed: Nov. 2, 2014

(65) Prior Publication Data

US 2015/0130187 A1 May 14, 2015

(30) Foreign Application Priority Data

Nov. 11, 2013 (EP) .................................. 13192327

(51) Int. Cl.
| | |
|---|---|
| *F03D 7/02* | (2006.01) |
| *F03D 9/00* | (2016.01) |
| *H02M 5/42* | (2006.01) |
| *H02P 9/04* | (2006.01) |
| *F03D 7/04* | (2006.01) |
| *H02J 3/38* | (2006.01) |
| *G05B 13/02* | (2006.01) |

(Continued)

(52) U.S. Cl.
CPC ............ *F03D 7/0284* (2013.01); *F03D 7/048* (2013.01); *F03D 9/005* (2013.01); *G05B 13/021* (2013.01); *H02J 3/386* (2013.01); *H02J 3/50* (2013.01); *H02M 5/42* (2013.01); *H02P 9/04* (2013.01); *H02P 2101/15* (2015.01); *Y02E 10/723* (2013.01); *Y02E 10/763* (2013.01)

(58) Field of Classification Search
CPC ........ G05B 13/021; F03D 7/048; F03D 9/005; F03D 7/0284; H02J 3/386; H02J 3/50; H02M 5/42; H02P 9/04
USPC .................................................. 290/44, 55
See application file for complete search history.

(56) References Cited

U.S. PATENT DOCUMENTS

| | | | |
|---|---|---|---|
| 2009/0146500 A1* | 6/2009 | Jones ................. | H02M 5/4585 307/82 |
| 2010/0025994 A1* | 2/2010 | Cardinal .............. | F03D 7/0284 290/44 |

(Continued)

FOREIGN PATENT DOCUMENTS

| | | |
|---|---|---|
| WO | 2009083446 A2 | 7/2009 |
| WO | 2009083448 A2 | 7/2009 |
| WO | WO 2011050807 A2 * | 5/2011 ................ H02J 3/16 |

*Primary Examiner* — Viet Nguyen
(74) *Attorney, Agent, or Firm* — Beusse Wolter Sanks & Maire

(57) ABSTRACT

A wind turbine is provided having a first converter connected between an electric generator of the wind turbine and a DC link and a second converter connected between the DC link and an output of the wind turbine connectable to a utility grid. The wind turbine further includes a wind turbine controller adapted to control at least one of an output current of the wind turbine, an output voltage of the wind turbine, a reactive output power of the wind turbine, an output voltage of the DC link and an output current of the DC link. The wind turbine further includes a communication device adapted to receive a control signal and to set a control parameter of the wind turbine controller in accordance with the control signal. A network converter, method of operating a wind turbine, methods of operating a wind park and computer-readable storage medium are also provided.

11 Claims, 2 Drawing Sheets

(51) Int. Cl.
*H02J 3/50* (2006.01)
*H02P 101/15* (2015.01)

(56) References Cited

U.S. PATENT DOCUMENTS

| | | | | |
|---|---|---|---|---|
| 2010/0142237 | A1* | 6/2010 | Yuan | H02J 3/386 363/97 |
| 2011/0156389 | A1* | 6/2011 | Arlaban Gabeiras | F03D 9/005 290/44 |
| 2012/0101643 | A1* | 4/2012 | Kirchner | F03D 7/0284 700/287 |
| 2012/0139241 | A1* | 6/2012 | Haj-Maharsi | F03D 7/0224 290/44 |
| 2013/0015660 | A1* | 1/2013 | Hesselbæk | H02J 3/16 290/44 |
| 2013/0134710 | A1* | 5/2013 | Yuan | H02M 1/00 290/44 |
| 2014/0035284 | A1* | 2/2014 | Bech | F03D 9/005 290/44 |
| 2014/0300108 | A1* | 10/2014 | Sahukari | F03D 7/047 290/44 |
| 2015/0137520 | A1* | 5/2015 | Garcia | H02J 3/1885 290/44 |
| 2015/0159626 | A1* | 6/2015 | Tarnowski | F03D 7/028 290/44 |

\* cited by examiner

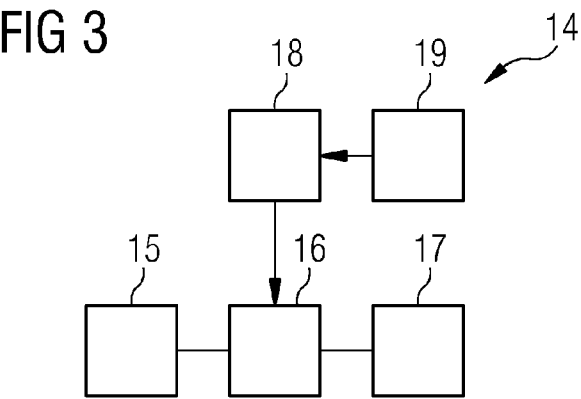
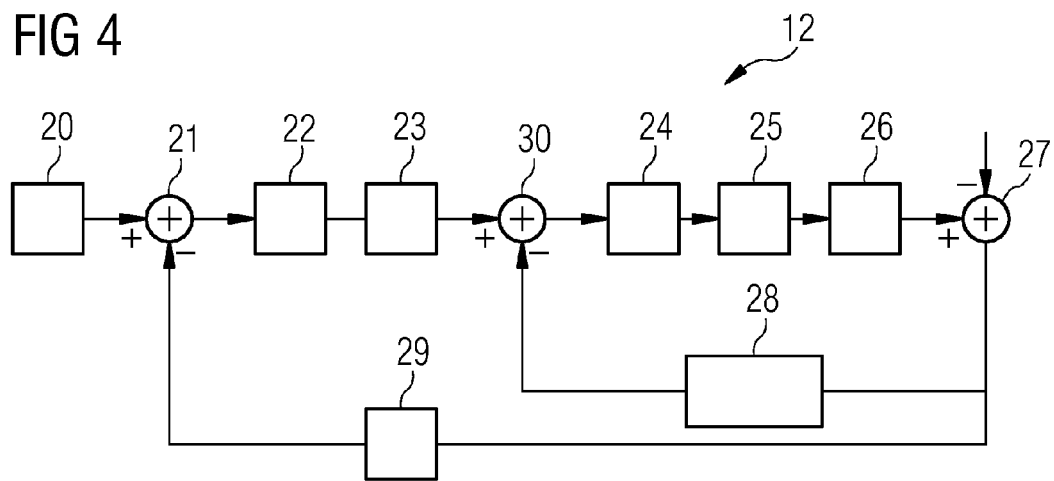
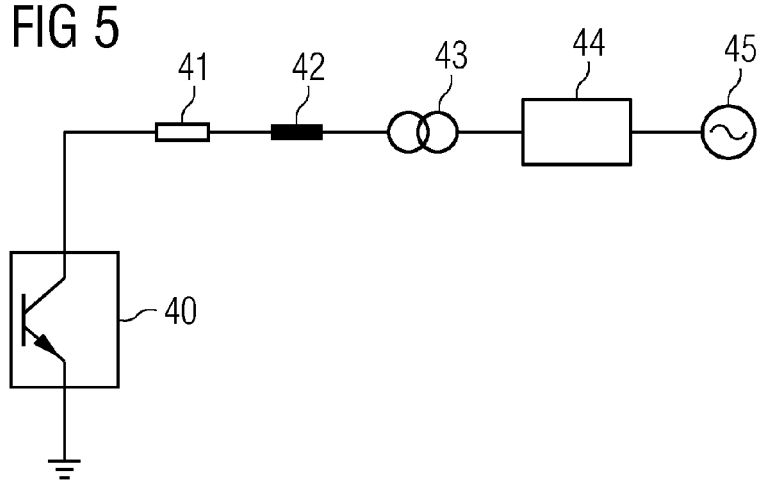

METHOD OF OPERATING A WIND PARK

CROSS REFERENCE TO RELATED APPLICATIONS

This application claims the benefit of European Application No. EP13192327 filed Nov. 11, 2013, incorporated by reference herein in its entirety.

FIELD OF THE INVENTION

The invention provides a wind turbine, a network converter, a method of operating a wind turbine, methods of operating a wind park and a computer-readable storage medium.

BACKGROUND

The share of wind power in the total electricity production has grown significantly during the last decades and continues to grow as more and also more efficient wind turbines and off-shore wind parks are constructed. A prominent problem caused by the steady increase of wind power production is that the fluctuating amount of power provided by wind parks can lead to stability problems in the utility grid. This is aggravated by the fact that many wind parks are located far away from the power consumers such that the wind power has to be transported over long distances and from poorly developed rural to metropolitan areas. In order to ensure proper network operation and interaction between different power providers and consumers in the same utility grid, wind turbines and wind parks have to comply with certain requirements which are tested using grid compliance tests. E.g., the electricity provided by a wind turbine needs to comply with strict demands with regard to output phase and frequency. However, as wind speed varies, so does the rotor speed of the wind turbine and thus the phase and frequency of the power provided by the generator of the wind turbine. To overcome this problem a common configuration includes a first converter used for rectifying the alternating voltage generated by the generator and to provide it to a DC link (DC, direct current) which includes a storage capacitor. Since the DC link inevitably has a very limited storage capacity, the power provided to the DC link needs to be fed to the utility grid or a collector grid interconnecting several to hundreds of wind turbines in the wind park. Hence, a second converter converts the voltage of the DC link to an AC current (AC, alternating current) having a desired phase and frequency and outputs the AC current. A control circuit, the wind turbine controller, is employed that varies at least one of an output current of the wind turbine, an output voltage of the wind turbine, a reactive output power of the wind turbine, an output voltage of the DC link and an output current of the DC link in accordance with the varying amount of power provided to the DC link by the generator through the first converter in order to keep the voltage of the DC link substantially constant. This control circuit has a certain bandwidth and needs to operate in a stable condition. Sometimes a loss of stability may occur in the control circuit. A common remedy for such a loss of stability is to reduce the bandwidth of the control circuit. However, it may happen that due to the reduced bandwidth the wind turbine fails the grid compliance test.

SUMMARY OF THE INVENTION

Thus, an embodiment of the invention provides a wind turbine having a first converter connected between an electric generator of the wind turbine and a DC link and a second converter connected between the DC link and an output of the wind turbine connected to or connectable to a utility grid. The wind turbine further includes a wind turbine controller for controlling at least one of an output current of the wind turbine, an output voltage of the wind turbine, a reactive output power of the wind turbine, an output voltage of the DC link and an output current of the DC link. According to aspects of the invention the wind turbine further comprises communication means adapted to receive a control signal and to set a control parameter of the wind turbine controller in accordance with the control signal. When it is mentioned herein that a control parameter is set, this control parameter will usually be the bandwidth of the respective controller. However, the bandwidth of a controller is determined by a number of parameters that depend on the specific implementation of the controller. For example, in some types of controllers the bandwidth of the controller may be set by setting a gain such as a proportional and/or an integral gain or by setting a bandwidth of a loop filter. Thus, the control parameter will be set in accordance with the number of active wind turbines in order to select a controller bandwidth suitable for the number of active wind turbines.

The wind turbine of the invention has an advantage in that the bandwidth of the wind turbine controller can be adapted to changing conditions of the utility grid to which the wind turbine is connected. E.g., the control parameter can be changed to a new value that ensures stability of the wind turbine controller when the impedance of the utility grid varies. The reason for this is that the impedance of the utility grid has an influence on the closed loop gain of the wind turbine controller. Thus, when the impedance of the electric connection of the wind turbine to the utility grid changes, so does the closed loop gain of the wind turbine controller. For this reason a lack of stability may occur. The invention overcomes this problem by changing the bandwidth of the wind turbine controller accordingly.

The communication means of the wind turbine is a device that may be adapted to receive an information about a Short Circuit Ratio of the utility grid and to set the control parameter of the wind turbine controller in accordance with the Short Circuit Ratio. The Short Circuit Ratio (SCR) is a measure for the strength of the utility grid and may be used for determining an appropriate bandwidth for the wind turbine controller. The SCR may be estimate on-line or off-line based on measurements or it may be calculated based on a short circuit study or on simulation models with input about the current grid configuration. Furthermore, the SCR may be received from external sources such as from an operator of the utility grid.

The communication means is a device that may also be adapted to receive an information about a number of active wind turbines in a wind park wherein the wind turbine is located and to set the control parameter of the wind turbine controller in accordance with the number of active wind turbines. The invention is based on the understanding that the number of active wind turbines in a wind park has a strong influence on the utility grid the wind park is connected to. This is especially true for wind parks that are located in remote areas where the utility grid is commonly comparatively weak. In such cases the load on the utility grid is determined by the number of active wind turbines because the power provided by the wind park is proportional to the number of active wind turbines. The number of active wind turbines has a direct influence on the network impedance as seen from the wind turbine. Accordingly the open loop gain of the wind turbine controller of an individual wind turbine in the wind park changes with the number of active wind turbines in the wind park. Thus, the number of active wind turbines in the wind park has a direct impact on controller stability of the individual wind turbines. The number of active wind turbines changes when wind turbines are down for maintenance, when new wind turbines are added to a wind park or under light wind conditions where some wind turbines may stop while others still experience enough wind to continue operation.

An embodiment of the wind turbine controller comprises a proportional-integral controller. Then, the communication means comprises a device that may be further adapted to set a proportional gain and an integral gain of the proportional-integral controller in accordance with the control signal. Proportional-integral controllers are a preferred choice for wind turbine controllers. Their closed loop gain may be set by choosing appropriate values for the proportional and integral gains. In some embodiments the proportional and/or integral gain may be selected from a plurality of predefined values in accordance with the number of active wind turbines signalled by the control signal. E.g., a proportional gain of Kp1 may be selected if the number of active wind turbines is between 0 and a number N1, a proportional gain of Kp2 may be selected if the number of active wind turbines is between N1 and a number N2 which is greater than N1, and so on.

The wind turbine controller may be a DC link controller connected to the DC link of the wind turbine and may comprise an outer loop for controlling the voltage of the DC link and an inner loop for controlling the output current of the DC link flowing through the second converter. Such cascaded controllers are especially useful for controlling the voltage of the DC link where a desired voltage level is determined by the currents flowing from and to the DC link.

In such cases the communication means is a device that may be adapted to set a corresponding bandwidth of the outer loop and the inner loop in accordance with the control signal. E.g., the bandwidth of the outer loop and that of the inner loop may be set to desired values and the ratio between the respective bandwidths of the outer loop and the inner loop may be kept constant even when the bandwidth of the DC link controller is changed. Preferably the bandwidth of the outer loop is about ten times smaller than that of the inner loop.

Since the same reasoning also applies to other components of a typical wind park, a second aspect of the invention provides a network converter comprising a network converter DC link connected between an input power converter and an output power converter and a network converter controller adapted to control at least one of an output current of the network converter, an output voltage of the network converter and a voltage of the network converter DC link. According to the second aspect of the invention the network converter further comprises network converter communication means adapted to receive a network converter control signal and to set a control parameter of the network converter controller in accordance with the network converter control signal. A network converter is typically connected between the wind turbines of a wind park and the utility grid and converts the electric power provided by the wind turbines to a power signal suitable for feeding the utility grid. The same modifications and implementation details as set forth above for the wind turbine of the invention can be used for the network converter of the invention.

A third aspect of the invention provides a method of operating a wind turbine having a first converter connected between an electric generator of the wind turbine and a DC link, a second converter connected between the DC link and an output of the wind turbine and a wind turbine controller for controlling at least one of an output current of the wind turbine, an output voltage of the wind turbine, a reactive output power of the wind turbine, an output voltage of the DC link and an output current of the DC link. The method comprises steps of:—receiving a control signal; and—setting a control parameter of the wind turbine controller in accordance with the control signal.

A fourth aspect of the invention is directed at a method of operating a wind park comprising a wind park controller and a plurality of wind turbines according to the invention. The method comprises steps of:—in the wind park controller, determining a number of active wind turbines in the wind park, generating a control signal comprising an information about a desired wind turbine controller bandwidth in accordance with the determined number of active wind turbines and sending the control signal to the active wind turbines; —in the active wind turbines, receiving the control signal and setting a control parameter of a wind turbine controller of the wind turbine in accordance with the received control signal.

Another aspect of the invention provides a method of operating a wind park comprising a network converter according to the second inventive aspect, a wind park controller connected to the network converter and a plurality of wind turbines. The method comprises steps of:—in the wind park controller, determining a number of active wind turbines in the wind park, generating a network converter control signal comprising an information about a desired network converter controller bandwidth in accordance with the determined number of active wind turbines and sending the network converter control signal to the network converter; —in the network converter, receiving the network converter control signal and setting a control parameter of a network converter controller in accordance with the received network converter control signal. The network converter may be one of a voltage controller, a reactive power controller, a current controller or a DC link voltage controller of the network converter. As with all embodiments of the various controllers of the invention as used in the various components of a wind park, setting the control parameter of the network controller may include setting a gain of the respective controller. The current controller can be located in the abc original frame, in the alpha-beta frame or in the dq synchronously rotating frame.

Furthermore, the invention provides a method of operating a wind park comprising a plurality of wind turbines and a wind park controller. The method comprises steps of:— determining a number of active wind turbines in the wind park and setting a control parameter of a controller of the wind park controller for controlling an output voltage of the wind park or an amount of reactive power provided by the wind park in accordance with the determined number of active wind turbines in the wind park.

Yet another aspect of the invention provides a computer-readable storage medium comprising program code for a controller of a wind turbine that, when executed by the controller, carries out the method of controlling a wind turbine of the invention. The controller may be a microcontroller or Central Processing Unit (CPU) installed in the wind turbine. In particular, it may be a microcontroller or CPU used for implementing the wind turbine controller.

This aspect of the invention is advantageous in that it may be applied to wind turbines already installed in a wind park by changing the operating software of the wind park and the wind park controller to execute the method of the invention.

The wind turbine controller may be set to control at least one of an output current of the wind turbine, an output voltage of the wind turbine, a reactive output power of the wind turbine, an output voltage of the DC link and an output current of the DC link in accordance with an operating mode of the wind turbine.

BRIEF DESCRIPTION OF THE DRAWINGS

The invention will be better understood from the following drawings in which a preferred embodiment of the invention will be illustrated by way of example. In the drawings:

FIG. 3 shows an embodiment of the network converter of the invention;

FIG. 4 shows an embodiment of a DC link controller; and

FIG. 5 shows an equivalent network diagram.

DETAILED DESCRIPTION

Figure 1:
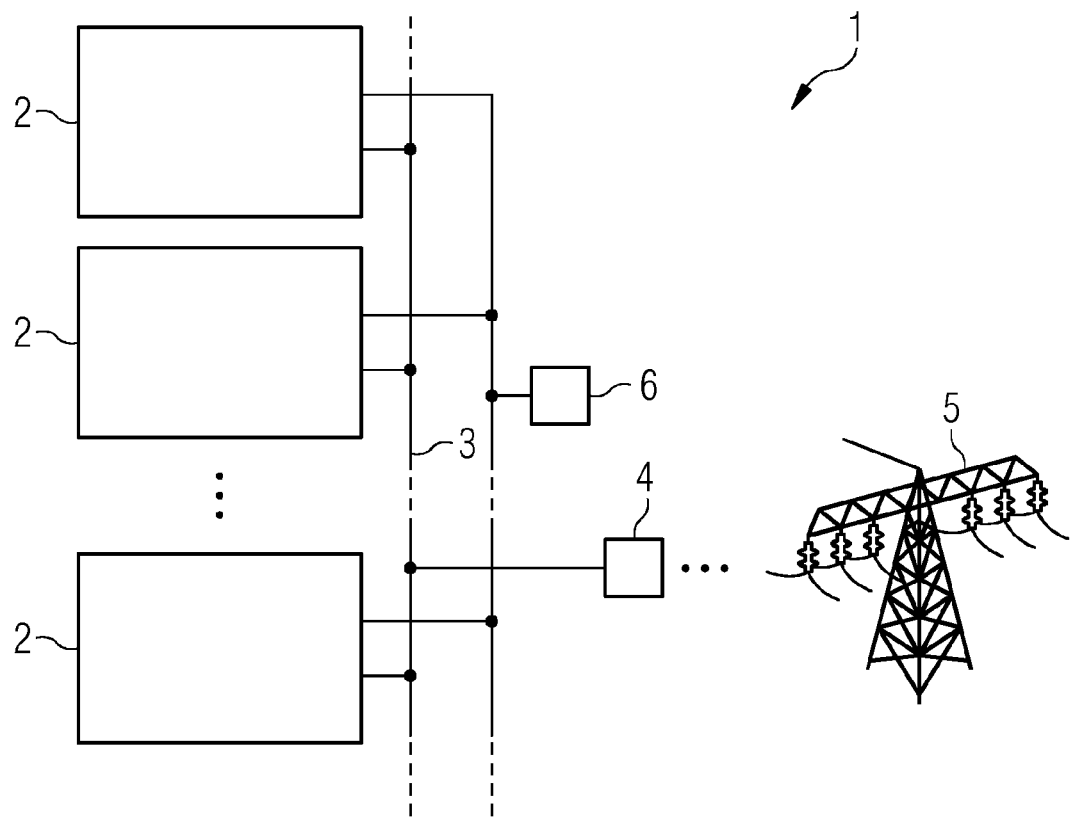
FIG. 1 shows a wind park in which a wind turbine may be tested using the wind turbine test method of the invention.

FIG. 1 shows a wind park 1 comprising a plurality of wind turbines 2 interconnected by a collector grid 3. The number of wind turbines 2 in the wind park 1 may range from several wind turbines 2 to hundreds or even thousands of wind turbines 2.

The wind park 1 connects to a utility grid 5 by means of a park transformer 4 which transforms a collector grid voltage at the collector grid 3 to a utility grid voltage at the utility grid 5. The park transformer 4 may be a multi-tap transformer capable of providing a selectable transformation ratio. In other cases the park transformer 4 may be part of a network converter or the park transformer 4 may be replaced by a network converter. In the case of an offshore wind park 1 the connection between the wind park and the utility grid may also be provided by means of a High-Voltage AC line or a High-Voltage DC line. In the latter case the park transformer 4 may be replaced by suitable DC transformation means which may include a network converter.

Operation of the wind park 1 is controlled by a wind park controller 6. The wind park controller 6 may set reference voltages and reference frequencies for each of the wind turbines 2 and controls the park transformer 4 or network converter.

Figure 2:
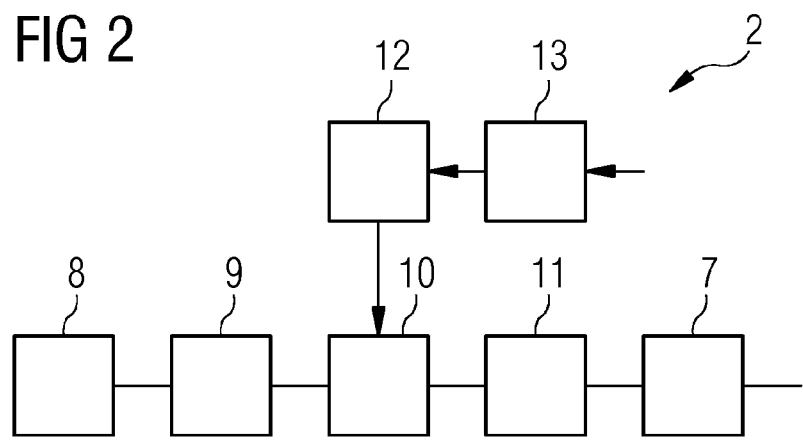
FIG. 2 shows an embodiment of the wind turbine of the invention.

FIG. 2 shows an embodiment of the wind turbine 2 of the invention. The wind turbine 2 comprises a generator 8 which is driven by a wind rotor (not shown), a first converter 9 for converting or rectifying electric power between the generator 8 and a DC link 10, a second converter 11 for converting electric power between the DC link 10 and an output of the wind turbine 2. The output may be directly connected to the collector grid 3 of the wind park 1 or by means of a wind turbine transformer 7. Commonly a voltage present at an input of the wind turbine transformer 7 will be lower than the voltage present on the collector grid 3 and the voltage of the collector grid will be lower than the voltage of the utility grid 5.

The wind turbine 2 further comprises a wind turbine controller 12 which in the example is a DC link controller adapted to control the voltage present on the DC link 10. However, this wind turbine controller may also be adapted to control at least one of an output current of the wind turbine, an output voltage of the wind turbine, a reactive output power of the wind turbine, an output voltage of the DC link and an output current of the DC link. This DC link voltage is determined by the current provided by the generator 8 which varies with wind speed and by the current provided to the collector grid 3 by the wind turbine 2. It is a purpose of the DC link controller 12 to maintain the DC link voltage substantially constant during operation of the wind turbine 2. According to the invention the wind turbine 2 further comprises communication means 13 which is a device that may communicate with the park controller 6 of the wind park 1. It would also be possible to connect the communication means 13 of each wind turbine 2 to those of all other wind turbines 2 in the wind park 1 and have the wind turbines 2 carry out the method of the invention individually and independently from any central controlling means such as the wind park controller 6. In this case each wind turbine 2 would announce its presence and status via its communication means 13 to all other wind turbines 2 in the wind park as part of the control signal and each wind turbine 2 would set the bandwidth of its DC link controller 12 in accordance with the information conveyed by the control signal in this way. This would represent a distributed wind park controller 6. However, in the embodiment shown in FIG. 1 the control signal will be sent from the park controller 6 which gathers relevant data from an operator of the utility grid 5 and from the wind turbines 2 in the wind park 1 that are required to generate an appropriate control signal.

FIG. 3 shows an embodiment of the network converter 14 of the invention. The network converter 14 comprises a network converter DC link 16 connected between an input power converter 15 and an output power converter 17. Furthermore, the network converter 14 comprises a network converter controller 18 connected to the network converter DC link 16. Alternatively or in addition the network converter controller may be connected to the output power converter. Moreover, network converter communication means 19 are provided. Functioning and operation of the network converter 14 is similar to that of the wind turbine of FIG. 2 when only contemplating the first and second converters 9 and 11, respectively, the DC link 10, the DC link controller 12 and the communication means 13. For this reason redundant description will be omitted. As with the wind turbines 2 of FIG. 2, the network converter 14 of FIG. 3 may further comprise an output transformer connected between the output power converter 17 and an output of the network converter 14 (not shown).

FIG. 4 shows an embodiment of a DC link controller 12 as it could be used in the wind turbine 2 or as a network converter controller 18 in the network converter 14 of the invention. The DC link controller 12 has a cascaded structure with an outer loop and an inner loop. The outer loop controls the DC link voltage while the inner loop controls the current provided by the second converter 11 from the DC link 10 to the output of the wind turbine 2 (or to the wind turbine transformer 7). The balance of these two currents determines the DC link voltage, accordingly the control operation of the inner loop (current controller) has an impact on that of the outer loop (voltage controller). A voltage set point 20 for a desired DC link voltage is provided to an adder 21 having a negative input for a present DC link voltage generated by a capacitor 29 of the DC link 10. The present DC link voltage may be computed within the voltage controller. The difference between the voltage set point and the present DC link voltage constitutes a voltage error which needs to be compensated by the voltage controller. The voltage error is filtered and sampled by a first Sample-and-Hold latch 22 and the sampled values are fed to a first proportional-integral controller 23 which generates a current set point for an output current for the second converter 11. The present output current is subtracted in adder 30 from the current set point and the resulting current error is fed to a second Sample-and-Hold latch 24 whose output is connected to a second proportional-integral controller 25. The second proportional-integral controller 25 has an output connected to a Pulse-Width-Modulation controller 26 for the second converter 11 and thus determines the current flowing through the second converter 11. Another adder 27 subtracts a measured current flowing from the generator 8 to the DC link 10 from the current flowing through the second converter 11 yielding a current balance. This current balance should be zero but oscillates about this value due to the varying nature of the generator current. The current balance is fed to the capacitor 29 and thus changes the present DC link voltage fed to the adder 21. At the same time the current balance is fed to an output network 28 through which the output current has to pass. This output network 28 may reflect iron losses and the inductance of the wind turbine transformer 7. Usually the real output network 28 is modelled and its effect is computed in the controller. The resulting present output current is subtracted from the current set point by adder 30 as explained above thus completing the inner loop of the DC link controller 12. Commonly the bandwidth of the current controller is set to be 5 to 10 times larger than that of the voltage controller to ensure stability of the controllers. However, if the number of active wind turbines 2 in a wind park 1 changes, the bandwidths may change and this relation may fail resulting in loss of stability.

FIG. 5 shows an equivalent network diagram illustrating the impedance as seen from the wind turbine 2. A semiconductor switch 40 of the second converter 11 of the wind turbine 2 causes a current to flow through the wind turbine transformer and the corresponding interconnections. This is modelled by an ideal transformer 43, a total internal resistance 41 and a total internal inductance 42. Furthermore, the output current flows through a system impedance 44 reflecting the contributions of the collector grid, the park transformer 4 and the impedance of the utility grid 5 which may include an impedance of an overhead transmission line. An ideal voltage source 45 reflects the grid voltage of the utility grid 5.

In the analysis it will be found that the system impedance 44 varies with the number of active wind turbines in the wind park 1 because the output currents of all wind turbines have to pass through the same infrastructure of the wind park 1 and the utility grid 5. Accordingly the system impedance 44 as seen from a single wind turbine can be modelled as being N times the actual system impedance where N is the number of active wind turbines 2 in the wind park 1 (which corresponds to the total output power of the wind park 1). Since the system impedance is reflected in the output network 28 of the current controller, it can be concluded that the transfer function of the current controller also varies with the number of active wind turbines in the wind park. Computing the closed loop gain T(s) of the current controller as:

$$T(s)=(1/(sL+R)*(Kp+Ki/s))/(1+(1/(sL+R)*(Kp+Ki/s)))$$

where Kp designates a proportional gain of the current controller, Ki designates an integral gain of the current controller, and L and R designate the inductance and the resistance of the output network, it can be concluded that a closed loop gain T(s)=1/(1+tau*s) can be achieved by setting Kp=2*pi*f*L and Ki=2*pi*f*R, where tau=1/(2*pi*f).

However, since R and L depend on the number of active wind turbines in the wind park, according to the invention the proportional and integral gains Kp and Ki should be chosen in accordance with the number of active wind turbines in order to achieve optimal behaviour of the current controller.

Although the invention has been shown and described with respect to exemplary embodiments thereof, various other changes, omissions, and additions in form and detail thereof may be made therein without departing from the spirit and scope of the invention.

While the invention has been described in connection with a preferred embodiment, it is not intended to limit the scope of the invention to the particular form set forth, but on the contrary, it is intended to cover such alternatives, modifications, and equivalents as may be included within the scope of the invention as defined by the appended claims.

The invention claimed is:

1. A wind turbine comprising:
 a first converter connected between an electric generator of the wind turbine and a DC link,
 a second converter connected between the DC link and an output of the wind turbine connected to or connectable to a utility grid, and
 a wind turbine controller to control at least one of an output current of the wind turbine, an output voltage of the wind turbine, a reactive output power of the wind turbine, an output voltage of the DC link and an output current of the DC link,
 wherein the wind turbine further comprises a communication device to receive a control signal comprising information about a number of active wind turbines in a wind park which influences an impedance of the utility grid to change a bandwidth of the wind turbine controller in accordance with the control signal to maintain stability of the wind turbine controller; and
 wherein the wind turbine controller having a current controller and a voltage controller wherein a proportional gain parameter and an integral gain parameter of a closed loop gain of the current controller being a function of an inductance and resistance both of which are a function of the number of active wind turbines.

2. The wind turbine of claim 1,
 wherein the communication device receives information about a Short Circuit Ratio of the utility grid and to set the bandwidth of the wind turbine controller in accordance with the Short Circuit Ratio.

3. The wind turbine of claim 1,
 wherein the wind turbine controller comprises a proportional-integral controller and wherein the communication device sets a proportional gain (Kp) and an integral gain (Ki) of the proportional-integral controller in accordance with the control signal.

4. The wind turbine of claim 1,
 wherein the wind turbine controller is a DC link controller connected to the DC link of the wind turbine and comprises an outer loop for controlling the voltage of the DC link and an inner loop for controlling the output current of the DC link flowing through the second converter.

5. The wind turbine of claim 4,
 wherein the communication device sets a corresponding bandwidth of the outer loop and the inner loop in accordance with the control signal.

6. A network converter comprising
 a network converter DC link connected between an input power converter and an output power converter, and a network converter controller to control at least one of an output current of the network converter, an output voltage of the network converter and a voltage of the network converter DC link, wherein the network converter further comprises a network converter communication device to receive a network converter control signal comprising information about a number of active wind turbines in a wind park which influences an impedance of a utility grid to change a bandwidth of the network converter controller in accordance with the network converter control signal; and wherein the network converter controller having a current controller and a voltage controller wherein a proportional gain parameter and an integral gain parameter of a closed loop gain of the current controller being a function of an inductance and resistance both of which are a function of the number of active wind turbines.

7. A method of operating a wind turbine having a first converter connected between an electric generator of the wind turbine and a DC link, a second converter connected between the DC link and an output of the wind turbine and a wind turbine controller for controlling at least one of an output current of the wind turbine, an output voltage of the wind turbine, a reactive output power of the wind turbine, an output voltage of the DC link and an output current of the DC link, the method comprising steps of:

receiving a control signal comprising information about a number of active wind turbines in a wind park which influences an impedance of a utility grid;

setting a bandwidth of the wind turbine controller in accordance with the control signal to maintain stability of the wind turbine controller; and determining, for the wind turbine controller having a current controller, a closed loop gain having a proportional gain and an integral gain of the current controller, the proportional gain and integral gain being a function of an inductance and resistance both of which being a function of the number of active wind turbines.

8. A non-transitory computer-readable storage medium comprising program code for a controller of a wind turbine that, when executed by the controller, carries out the method of claim 7.

9. A method of operating a wind park comprising a wind park controller and a plurality of wind turbines, the method comprising steps of:

in the wind park controller,
  determining a number of active wind turbines in the wind park,
  generating a control signal comprising information about a desired DC link controller bandwidth in accordance with the determined number of active wind turbines which influences an impedance of a utility grid, and sending the control signal to the active wind turbines;

in the active wind turbines,
  receiving the control signal comprising the information and
  setting a bandwidth of a wind turbine controller of the wind turbine in accordance with the received control signal to maintain stability of the wind turbine controller; and determining, for the wind turbine controller having a current controller, a closed loop gain having a proportional gain and an integral gain of the current controller, the proportional gain and integral gain being a function of an inductance and resistance both of which being a function of the number of active wind turbines.

10. A method of operating a wind park comprising a network converter, a wind park controller connected to the network converter and a plurality of wind turbines, the method comprising steps of:

in the wind park controller,
  determining a number of active wind turbines in the wind park which influences an impedance of the utility grid,
  generating a network converter control signal comprising information about a desired network converter controller bandwidth in accordance with the determined number of active wind turbines, and
  sending the network converter control signal to the network converter;

in the network converter,
  receiving the network converter control signal, and
  setting a bandwidth of a network converter controller in accordance with the received network converter control signal to maintain stability of the network converter controller wherein the network converter controller having a current controller and a voltage controller wherein a proportional gain parameter and an integral gain parameter of a closed loop gain of the current controller being a function of an inductance and resistance both of which are a function of the number of active wind turbines.

11. A method of operating a wind park comprising a plurality of wind turbines and a wind park controller, the method comprising steps of:

determining a number of active wind turbines in the wind park which influences an impedance of the utility grid, setting a bandwidth of a controller of the wind park controller for controlling an output voltage of the wind park or an amount of reactive power provided by the wind park in accordance with the determined number of active wind turbines in the wind park; and determining, for the wind turbine controller having a current controller, a closed loop gain having a proportional gain and an integral gain of the current controller, the proportional gain and integral gain being a function of an inductance and resistance both of which being a function of the number of active wind turbines.

* * * * *